United States Patent [19]

Onoda

[11] 4,250,438
[45] Feb. 10, 1981

[54] DIGITALLY CONTROLLED ACCELERATION AND DECELERATION SYSTEM

[75] Inventor: Fumio Onoda, Tokyo, Japan

[73] Assignee: Oki Electric Industry Co., Ltd., Tokyo, Japan

[21] Appl. No.: 884,226

[22] Filed: Mar. 7, 1978

[51] Int. Cl.³ ............................................. G05B 13/00
[52] U.S. Cl. .................................................. 318/561
[58] Field of Search ................. 318/561, 616; 364/105

[56] References Cited

U.S. PATENT DOCUMENTS

| | | | |
|---|---|---|---|
| 3,241,015 | 3/1966 | Allen | 318/561 |
| 3,952,238 | 4/1976 | Cutler | 318/561 |

*Primary Examiner*—Gene Z. Rubinson
*Assistant Examiner*—Eugene S. Indyk
*Attorney, Agent, or Firm*—Frailey & Ratner

[57] ABSTRACT

A digitally controlled acceleration and deceleration system in which the goal velocity applied to the object in the acceleration mode and the deceleration mode changes linearly, instead of the flat goal velocity, thus, the acceleration and/or deceleration applied to the object to be controlled in the feedback loop becomes flat, and the acceleration time and/or deceleration time is reduced. The outputs of the variable frequency pulse generator and the fixed frequency pulse generator are combined together to provide said goal velocity, and the number of the sum of two pulse generators is utilized as a command position for the movement of the object.

2 Claims, 8 Drawing Figures

DIGITALLY CONTROLLED ACCELERATION AND DECELERATION SYSTEM

BACKGROUND OF THE INVENTION

The present invention relates to a system for the acceleration and deceleration utilizing digital control in a feedback control system.

The present invention is applicable to a numerical control machine tool, an automatic curve tracer, a magnetic disk memory drive system, et al.

First, a prior digital control system will be explained in accordance with FIG. 1, FIG. 2 and FIG. 3.

FIG. 1 is a block-diagram of a prior feedback type digital control system. In FIG. 1, the reference numeral 1 is a position register, the content of which shows the command position at which a table of a machine tool must be stopped. 2 is the first comparator which detects the difference between the command position indicated in the position register 1 and the present position of the table to be controlled. 3 is the second comparator for providing the difference between the output of said first comparator 2 and a velocity function which will be explained later. 4 is a motor drive, 5 is a motor for moving the table of the machine tool, 7 is the first detector for detecting the present position of the table, 6 is the second detector for detecting the velocity of the table, 8 is the matching circuit for providing the velocity function. The input command on paper tape is read into the position register 1, and the content of the position register indicates that the table is to be moved 0.001 mm for each pulse. When the content of the position register 1 is M, the table is moved by 0.001×M mm. Supposing that the frequency of the command pulse in the position register 1 is $v_i(t)$, which is the command velocity of the table, the output of the position register 1 is $$\int v_i(t)dt$$

and said output of the position register 1 indicates the goal position of the table. And supposing that $v_O$ is the velocity of the table, the present position of the table obtained from the first detector 7 is $$\int v_O(t)dt$$

The output of the second detector 6 is $v_O(t)$ and is connected to the input of the matching circuit 8, which provides the velocity function $\tau v_O(t)$, where $\tau$ is a constant. The first comparator 2 provides the difference between the command position and the present position as follows.

$$\int v_i(t)dt - \int v_O(t)dt$$

And the second comparator 3 provides the difference between the output of the first comparator 2 (difference between the positions) and the velocity function as follows.

$$\int v_i(t)dt - \int v_O(t)dt - \tau v_O(t)$$

The motor drive 4 drives the motor 5 so that the output of the second comparator 3 becomes zero. Accordingly, the operation of the apparatus of FIG. 1 is shown in the formula (1).

$$\int v_i(t)dt - \int v_O(t)dt - \tau v_O(t) = 0 \qquad (1)$$

It should be appreciated that the frequency of the command pulses relates to the velocity of the table, and the number of pulses relates to its length of travel.

FIG. 2 shows the block-diagram of the calculator for calculating the command position for the apparatus in FIG. 1. In FIG. 2, the reference numeral 9 is the input switch for initiating the start and/or stop of the movement of the table, 10 is a sign register for storing the sign (plus or minus) concerning the direction of travel, 11 is a control circuit for controlling the start and/or stop of the movement, 12 is a pulse generator the oscillating frequency of which is constant, 13 is an output circuit which provides the command pulse with the sign from the sign register 10, and the output circuit 13 is connected to the position register 1 in FIG. 1. 14 indicates the apparatus shown in FIG. 1.

When the switch 9 is turned on, the sign register 10 stores the sign of the movement, and the pulse generator 12 generates a train of pulses under the control of the control circuit 11, and the output circuit 13 provides the command pulse with the sign from the sign register 10 to the position register 1. When the switch 9 is turned off, the control circuit 11 causes the pulse generator 12 to stop. The frequency of the pulse generator 12 is equal to $v_i(t)$, accordingly, $$v_i(t) = F \qquad (2)$$

From the formulae (1) and (2), the formulae (3) and (4) are derived.

$$v_O(t) = F(1 = \exp(-t/\tau)) \qquad (3)$$

$$v_O(t) = F \exp(-t/\tau) \qquad (4)$$

Formula (3) is available in acceleration period and the formula (4) is available during the deceleration period. The difference between the formulae (3) and (4) results from the difference of the initial values of the integral operation in solving the formulae (1) and (2).

The solid line in FIG. 3 shows the command velocity of the command pulses applied to the circuit 14, and it should be noted that the command velocity in the prior art is constant or flat. The dotted line in FIG. 3 shows the actual velocity of the table. As shown in FIG. 3, when the command velocity F is given, the table is accelerated gradually according to the formula (3) and reaches the final velocity F, and when the command velocity becomes zero the table is decelerated and gradually reaches zero velocity according to the formula (4). Since the command velocity in the prior art is constant or flat, the acceleration of the table is maximum at the start of its movement and the deceleration of the table is also maximum at the start of the deceleration period. It should be noted that the acceleration and/or deceleration is the differential coefficient of the velocity, and the power applied to the motor and/or the table is proportional to the acceleration and/or deceleration. Since there is an allowable maximum limit of acceleration and/or deceleration in each motor and/or table, the actual acceleration and/or the actual deceleration applied to the motor and/or the table must be smaller than the maximum limit, and therefore it takes a long time to reach constant velocity from the stationary condition, and/or to reach the zero velocity from the constant velocity. Further, the prior art has the further disadvantage that the power consumption of the motor is large since the acceleration time and/or deceleration time in the prior art is long.

SUMMARY OF THE INVENTION

It is an object, therefore, of the present invention to overcome the disadvantages and limitations of a prior acceleration and/or deceleration system utilizing a digital control feedback system by providing a new and improved acceleration and/or deceleration system.

Another object of the present invention is to provide an acceleration and/or deceleration system which can accelerate and/or decelerate to a given velocity in a shorter time, and with smaller power consumption.

The above and other objects of the present invention are attained by a digitally controlled acceleration and deceleration system comprising a motor for moving the object to be controlled, a plurality of detectors for detecting the velocity and the position of said object, a position register for commanding the desired position of said object, and a plurality of comparators for comparing the difference between the content of said position register and the outputs of said detectors, characterized in that further comprising a variable pulse generator, a plurality of fixed pulse generators, frequency detection means for detecting that the frequency of said variable pulse generator reaches a predetermined value, means for adding the output of said variable pulse generator and the output of one of said fixed pulse generators until said frequency detection means provides the output signal, and means for transferring the sum of the two generators to said position register.

BRIEF DESCRIPTION OF THE DRAWINGS

The foregoing and other objects, features, and attendant advantages of the present invention will be appreiated as the same become better understood by means of the following description and the accompanying drawings wherein.

DESCRIPTION OF THE PREFERRED EMBODIMENTS

According to the present invention, the command velocity is applied to the feedback system so that the acceleration and/or the deceleration of the motor is constant, rather than the command velocity being constant. The command velocity according to the present invention has three modes, the first concerns the acceleration mode, the second concerns the constant velocity mode, and the third concerns the deceleration mode.

When the length of travel required is very short, the second mode is omitted and the first mode goes directly to the third mode.

Figure 1:
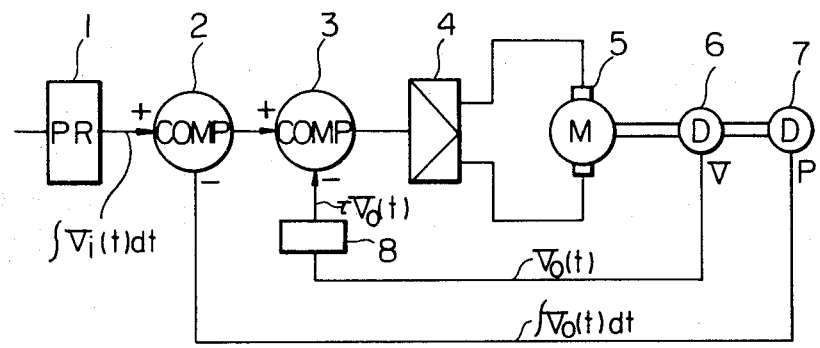
FIG. 1 is the block-diagram of a prior feedback type digital control system.
Figure 2:
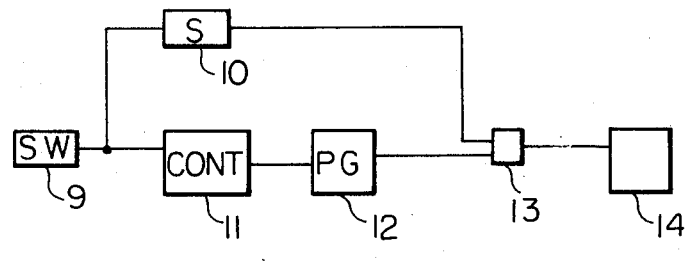
FIG. 2 is the block-diagram of the calculator for calculating the command position for the apparatus in FIG. 1.
Figure 4:
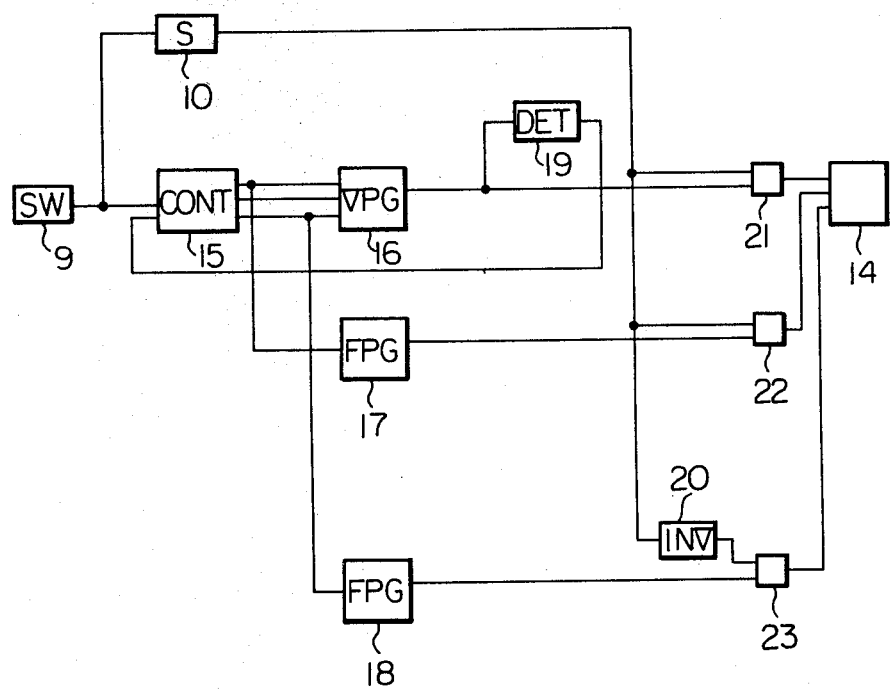
FIG. 4 is the block-diagram of the calculator for calculating the command position according to the present invention.

FIG. 4 is the block-diagram of the calculator for calculating the command position according to the present invention, and in this figure, the reference numeral 9 is the input switch for initiating the start and/or stop of the movement, 10 is a sign register for storing the sign (plus or minus) concerning the direction of the movement, and 14 indicates the apparatus shown in FIG. 1. The reference numeral 15 is the control circuit for controlling the start, the acceleration, the constant speed, the deceleration, and the stop of the movement, 16 is a variable pulse generator which can vary the frequency of the generated pulses, 17 and 18 are fixed generators the frequency of which is fixed. 19 is the frequency detection circuit for detecting the output frequency of the variable pulse generator 16. 20 is the inverter which changes the sign from the sign register 10. And 21, 22 and 23 are output circuits connected to the position register 1 in FIG. 1.

When the switch 9 is turned on, the sign register 10 stores the sign (direction) of travel, and the control circuit 15 which is now in the acceleration mode, causes the variable pulse generator 16 to provide an output frequency which is increased linearly from the frequency zero, and also causes the fixed pulse generator 17 to provide a constant frequency. When the frequency detection circuit 19 detects that the output frequency of the variable pulse generator 16 reaches the frequency F, the control circuit 15 changes the operational mode from the acceleration mode to the constant speed mode. In the constant speed mode, the control circuit 15 causes the variable pulse generator 16 to generate the constant frequency F, and to stop the fixed pulse generator 17. Next, when the switch 9 is turned off, the control circuit 15 changes the operational mode from the constant speed mode to the deceleration mode. In the deceleration mode, the control circuit 15 causes the variable pulse generator 17 to provide a frequency which is reduced linearly from the frequency F, and causes the fixed pulse generator 18 to generate the necessary pulse trains. When the frequency detection circuit 19 detects that the output frequency of the variable pulse generator 16 has reached zero in the deceleration mode, the mode is changed from the deceleration mode to the stop mode. In the stop mode, the control circuit 15 causes both the variable pulse generator 16 and the fixed generator 18 to stop.

It should be appreciated that when the switch 9 is turned off during the acceleration mode (not in the constant speed mode), the mode is changed from the acceleration mode to the deceleration mode directly, and the variable pulse generator 16 provides the frequency which reduces linearly from $F_r$ which is the frequency with the switch 9 being turned off, the fixed pulse generator 17 stopes, and the other fixed pulse generator 18 starts.

The output circuit 21 applies the command pulses to the position register 1 according to the output pulses from the variable pulse generator 16 and the sign from the sign register 10. The output circuit 22 applies the command pulses to the position register 1 according to the output pulses from the fixed pulse generator 17 and the sign from the sign register 10. The output circuit 23 applies the command pulses to the position register 1 according to the pulses from the fixed pulse generator 18 and the inverted sign of the sign register 10.

Now, the above operation will be explained in more detail using mathematical expressions.

Supposing that the output frequencies of the variable pulse generator 16 and the fixed pulse generator 17 in the acceleration mode are shown in the formulae (5) and (6) respectively, the frequency of the pulses applied to the position register 1 is shown in formula (7).

$$v_{16}(t) = \frac{F}{a} t \text{ (}a\text{ is constant)} \tag{5}$$

$$v_{17}(t) = v_r \tag{6}$$

$$v_i(t) = v_{16}(t) + v_{17}(t) = \frac{F}{a} t + v_r \tag{7}$$

In the constant speed mode, the output frequency $v_{16}(t)$ of the variable pulse generator 16 and the frequency $v_i$ applied to the position register 1 are shown in the formulae (8) and (9) respectively.

$$v_{16}(t) = F \tag{8}$$

$$v_i(t) = v_{16}(t) = F \tag{9}$$

In the deceleration mode, the output frequencies of the variable pulse generator 16, and the fixed pulse generator 18 are shown in the formulae (10) and (11) respectively, and the Frequency $v_i$ applied to the position register 1 is shown in the formula (12).

$$v_{16}(t) = F - \frac{F}{b} t \text{ (}b\text{ is constant)} \tag{10}$$

$$v_{18}(t) = v_f \tag{11}$$

$$v_i(t) = v_{16}(t) - v_{18}(t) = F - \frac{F}{b} t - v_f \tag{12}$$

On the other hand, when the mode is changed to the deceleration mode directly from the acceleration mode, without passing through the constant speed mode, the frequency $v_{16}(t)$ of the variable pulse generator 16 is shown in the formula (13).

$$v_{16}(T_1) = F_r = \frac{F}{a} T_1 \tag{13}$$

where $F_r$ is the frequency of the variable pulse generator 16 when the mode is changed, and $T_1$ is the time of mode change. Accordingly, the frequency $v_{16}(t)$ of the variable pulse generator 16 in the deceleration mode and the value of $v_i(t)$ are shown in the formulae (14) and (15) respectively, $$v_{16}(t) = F_r - \frac{F}{b} t \tag{14}$$

$$v_i(t) = F_r - \frac{F}{b} t - v_f \tag{15}$$

Figure 3:
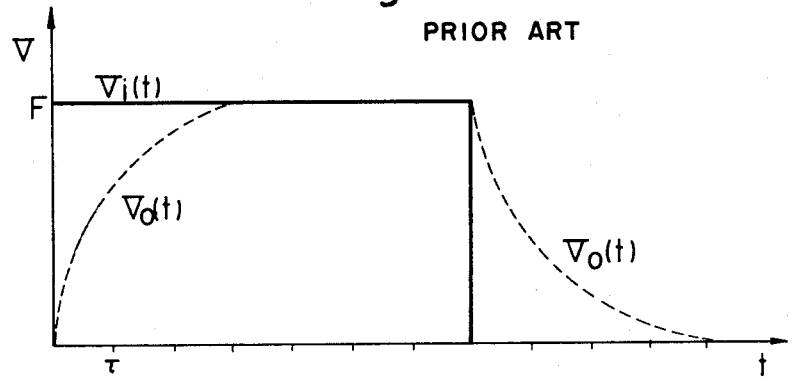
FIG. 3 shows the curves of the command velocity and the actual velocity in a prior art.

The circuit of FIG. 3 operates as explained above.

Next, the length of travel of the table will be explained.

The acceleration time $T_r$ during which the velocity $v_{16}(t)$ changes from zero to F is derived from the formula (5) and is $$T_r = a \tag{16}$$

And the deceleration time $T_f$ during which $v_{16}(t)$ changes from F to zero is derived from the formula (10) and is $$T_f = b \tag{17}$$

Accordingly, assuming the equation (18), $$v_{17}(t) = S/a, \quad v_{18}(t) = S/b \tag{18}$$
(S is constant)

the number of pulses obtained from the fixed pulse generator 17 during the acceleration mode becomes equal to the number of pulses obtained from the fixed pulse generator 18 during the deceleration mode, and thus the formula (19) is derived from the formulae (16), (17) and (18).

$$v_{17}(t) \times T_r = v_{18}(t) \times T_f = S \tag{19}$$

It should be appreciated that the sign of the output pulses from the output circuit 22 is opposite to that of the pulses from the output circuit 23, and then the movement of the table by the pulses from the output circuit 22 is cancelled by those from the output circuit 23. The movement of the table depends solely upon the number of pulses generated by the variable pulse generator 16.

In case the acceleration mode changes directly to the deceleration mode, the relationship between the acceleration time $T_1$ and the deceleration time $T_2$ is $v_{16}(T_2) = 0$, and the formula (20) is derived from the formulae (13) and (14).

$$T_1/T_2 = a/b \tag{20}$$

Accordingly, the formula $v_{17}(t) \times T_1 = v_{18}(t) \times T_2$ is satisfied, and thus, the output pulses of the fixed pulse generators 17 and 18 cancel each other out.

Now, another embodiment wherein $$v_{17}(t) = \tau F/a, \quad v_{18}(t) = \tau F/b \tag{21}$$

is satisfied will be explained below. In this case $v_i(t)$ is calculated from the formulae (7), (9), (12) and (15) as follows.

$$v_i(t) = \frac{F}{a} t + \frac{\tau F}{a} \text{ (acceleration mode)} \tag{22}$$

$$v_i(t) = F \text{ (constant speed mode)} \tag{23}$$

$$v_i(t) = F - \frac{F}{b} t - \frac{\tau F}{b} \text{ (deceleration mode)} \tag{24}$$

$$v_i(t) = F_r - \frac{F}{b} t - \frac{\tau F}{b} \tag{25}$$

(case in which the mode is changed from acceleration mode to deceleration mode directly)

Accordingly, the velocity $v_O(t)$ in each case is shown as follows from the above formulae (22), (23), (24) and (25).

$$v_O(t) = (F/a)t \text{ (acceleration mode)} \tag{26}$$

$$v_O(t) = F \text{ (constant speed mode)} \tag{27}$$

$$v_O(t) = F - (F/b)t \text{ (deceleration mode)} \tag{28}$$

$$v_O(t) = F_r - (F/b)t \text{ (case that the mode is changed from acceleration mode to deceleration mode directly)} \tag{29}$$

Figure 5:
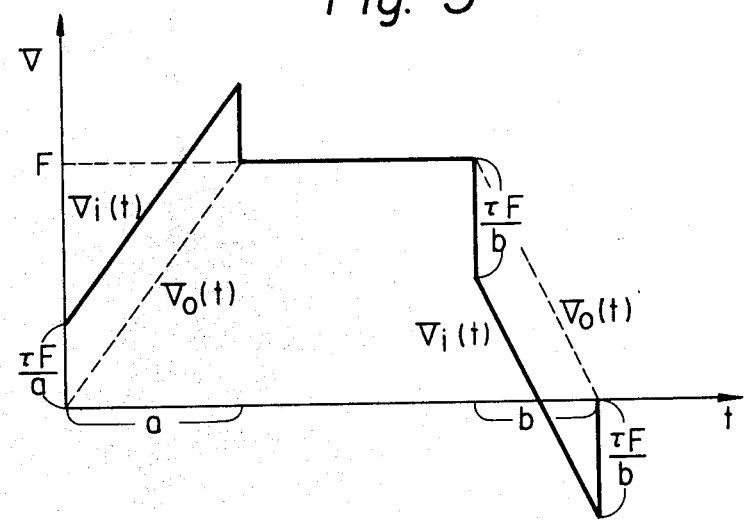
FIG. 5 shows the curves of the command velocity and the actual velocity in the present invention.
Figure 6:
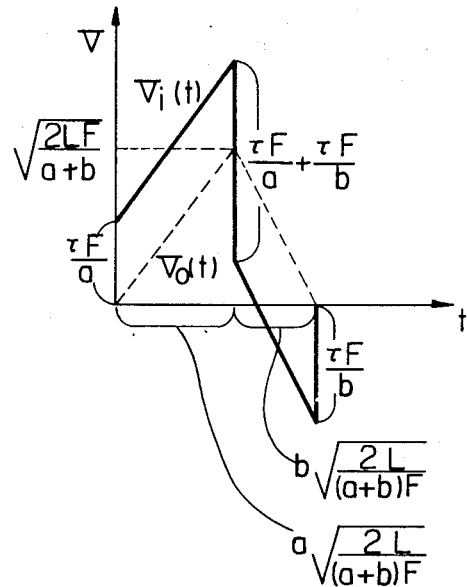
FIG. 6 shows another curve of the command velocity and the actual velocity in the present invention.

The curves of $v_i(t)$ and $v_O(t)$ when there are three modes (acceleration mode, deceleration mode, and constant speed mode) are shown in FIG. 5 in solid and dotted lines, respectively. And FIG. 6 shows the curves of $v_i(t)$ and $v_O(t)$ when the acceleration mode changes directly to the deceleration mode. The solid line in FIG. 6 shows $v_i(t)$ and the dotted line in FIG. 6 shows $v_O(t)$.

It should be appreciated of course that many modifications of FIG. 4 are possible to those skilled in the art. For instance, the control circuit 15 can control the variable pulse generator 16 so that the variable pulse generator 16 has a predetermined initial frequency instead of zero frequency in the acceleration mode; and the deceleration mode is changed to the stop mode when the frequency detection circuit 19 detects that the frequency of the variable pulse generator 16 is reduced to a predetermined frequency (not zero). Further, a single fixed pulse generator can replace both the fixed pulse generators 17 and 18.

Figure 7:
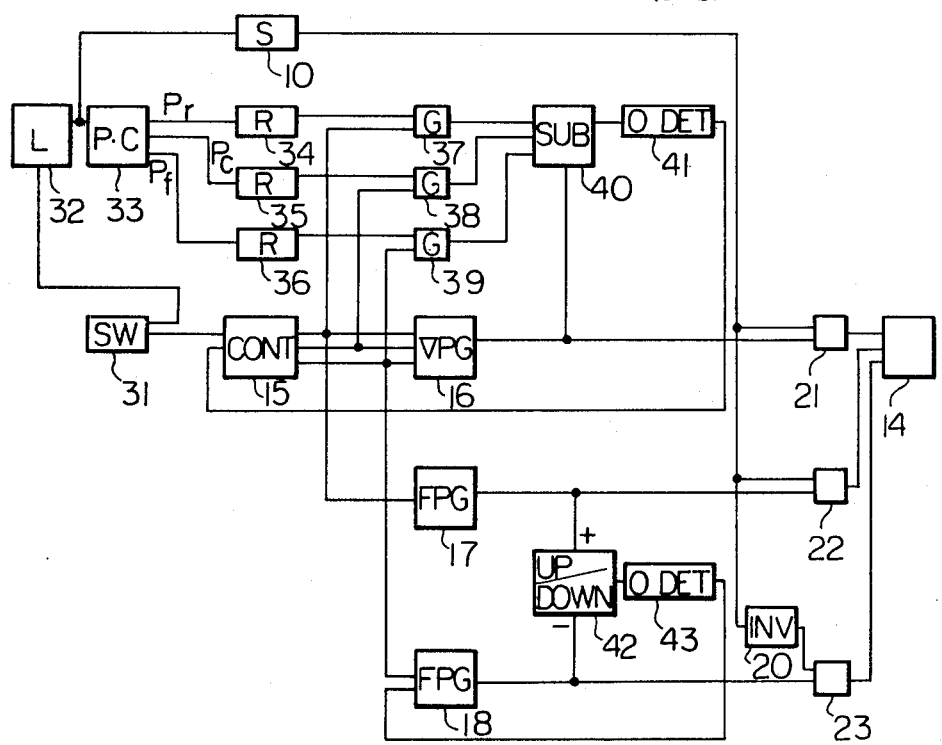
FIG. 7 is the other block-diagram of the calculator for calculating the command position according to the present invention.

FIG. 7 shows the block-diagram of another calculator according to the present invention, and in FIG. 7 the same members as those in FIG. 4 have the same reference numerals. The reference numeral 31 is a switch for initiating the start and stop of the table, 32 is a register for storing the length of travel L calculated from the input information through a tape reader (not shown), 33 is a calculator for calculating the number of output pulses $P_r$, $P_c$ and $P_f$ of the variable pulse generator 16 during the acceleration period, constant speed period, and deceleration period, respectively, from the moving length L. 34 is the $P_r$ register for storing the number of pulses provided in the acceleration mode. 35 is the $P_c$ register for storing the number of pulses provided in the constant speed mode, and 36 is the $P_f$ register for storing the number of pulses provided in the deceleration mode. 37 is the $P_r$ output circuit for providing the content of the $P_r$ register 34 at the initial stage of the acceleration mode, 38 is the $P_c$ output circuit for providing the content of the $P_c$ register 35 at the initial stage of the constant speed mode, and 39 is the $P_f$ output circuit for providing the content of the $P_f$ register 36 at the initial stage of the deceleration mode. The output circuits 37, 38 and 39 consist of gate circuits. The reference numeral 40 is the subtracting counter which is initiated by the output of the circuits 37, 38 or 39 and the content of the counter 40 is decremented by each pulse from the variable pulse generator 16. 41 is the first zero detector for detecting that the content of the counter 40 has reached zero, 42 is the up/down counter the content of which is incremented by the pulses from the fixed pulse generator 17, and decremented by the pulses from the fixed pulse generator 18. 43 is the second zero detector for detecting that the content of the counter 42 has reached zero. The variable pulse generator 16 operates as defined by the formulae (5), (8), (10), and (14) and the fixed pulse generators 17 and 18 operate as defined by the formula (18).

When the switch 31 causes the tape reader to read the input information, the register stores the length of travel L of the table and the sign register 10 stores the sign of the direction of travel. The calculator 33 performs the following calculation and the values $P_r$, $P_c$ and $P_f$ are stored in the registers 34, 35 and 36, respectively.

$$P_r = aF/2,\ P_c = L - aF/2 - bF/2,\ P_f = bF/2,\ \text{(when } L > aF/2 + bF/2) \tag{30}$$

$$P_r = \frac{a}{a+b}L,\ P_c = 0,\ P_f = \frac{b}{a+b}L,$$
$$\text{(when } L \leq aF/2 + bF/2) \tag{31}$$

It should be appreciated in the above formula that F is the constant speed, "a" is the acceleration time, and "b" is the deceleration time. $P_r$ and $P_f$ in the formula (30) are obtained by integration of the formula (5) and (10), and $P_c$ in the formula (30) is obtained by subtracting $P_r$ and $P_f$ from L. The formula (30) relates to the case that all three modes (acceleration, constant speed, and deceleration) are provided, and the formula (31) relates to the case that the acceleration mode changes directly to the deceleration mode.

When the switch 31 is switched on, the control circuit 15 establishes the acceleration mode, and the content of the $P_r$ register 34 is transferred to the counter 40 through the output circuit 37, the variable pulse generator 16 operates according to the formula (5), and the fixed pulse generator 17 operates according to the formula (18). The up/down counter 42 receives the pulses from the fixed pulse generator 17 and adds the content of the same. The subtracting counter 40 decrements the content of the same each time a pulse from the variable pulse generator 16 is received.

When the first zero detection circuit 41 detects that the content of the counter 40 has reached zero, the control circuit 15 changes the mode from the acceleration mode to the constant speed mode. In the constant speed mode, the content of the $P_c$ register 35 is transferred to the subtracting counter 40 through the output circuit 38, the variable pulse generator 16 operates according to the formula (8), and the fixed pulse generator 17 stops. In the case of formula (30), the acceleration time $T_r$ is $T_r = a$, which is derived from the formulae (5) and (30) as follows.

$$P_r = aF/2 = \int_0^{T_r} v_{16}(t)\, dt = \int_0^{T_r} \frac{F}{a} t\, dt = \frac{F}{2a} T_r^2$$

Accordingly, $$T_r = a \tag{32}$$

Accordingly, $v_{16}(T_r)$ is shown below.

$$v_{16}(T_r) = (F/a) \times T_r = F \tag{33}$$

On the other hand, in the case of formula (31), the acceleration time $T_1$ is $$T_1 = a\sqrt{\frac{2L}{(a+b)F}},$$

which is derived from the formulae (5) and (31) as follows.

$$P_r = \frac{a}{a+b}L = \int_0^{T_1} v_{16}(t)\, dt = \int_0^{T_1} \frac{F}{a} t\, dt$$
$$= \frac{F}{2a} T_1^2$$

$$\text{Accordingly, } T_1 = a\sqrt{\frac{2L}{(a+b)F}} \tag{34}$$

Accordingly $v_{16}(T_1)$ is shown below.

$$v_{16}(T_1) = \frac{F}{a} \times T_1 = \sqrt{\frac{2FL}{a+b}} \tag{35}$$

The content of the subtracting counter 40 is decremented from the initial value $P_c$ each time the variable pulse generator 16 provides an output pulse, and when the first zero detection circuit 41 detects that the content of the counter 40 has reached zero, the constant speed mode is changed to the deceleration mode. If the value $P_c$ is zero, the change of mode is accomplished before the variable pulse generator 16 provides an output pulse.

If the deceleration mode, the content of the register 36 is transferred to the subtracting counter 40 through the output circuit 39, the variable pulse generator 16 operates according to the formula (10) or (14), and the fixed pulse generator 17 operates according to the formula (18). The up/down counter 42 the content of which is incremented in the acceleration mode, is then decremented each time the fixed pulse generator 18 provides an output pulse. And when the second zero detector 43 detects that the content of the counter 42 has reached zero, the fixed pulse generator 19 stops. In this mode, in case of the formula (30), the deceleration time $T_f$ is $T_f = b$, which is derived from the formulae (10) and (30) as follows.

$$P_f = \frac{bF}{2} \int_0^{T_f} v_{16}(t)\, dt = \int_0^{T_f} (F - (F/b)t)\, dt$$
$$= FT_f - \frac{F}{2b} T_f^2$$

Accordingly, $$T_f = b \tag{36}$$

Accordingly, $$v_{16}(T_f) = F - \frac{F}{b} T_f = 0 \tag{37}$$

In the case of formula (31), the deceleration time $T_2$ is $$b\sqrt{\frac{2F}{(a+b)F}}, \text{ since } P_f = \frac{b}{a+b} L,$$

and $F_r = v_{16}(T_1)$, and is derived from the formulae (14) and (35) as follows.

$$P_f = \frac{b}{a+b} L = \int_0^{T_2} v_{16}(t)\, dt = \int_0^{T_2} (F_r - \frac{F}{b} t)\, dt \tag{38}$$
$$= \sqrt{\frac{2FL}{a+b}} T_2 - \frac{F}{2b} T_2^2$$

Accordingly $T_2 = b\sqrt{\frac{2L}{(a+b)F}}$

Accordingly, $v_{16}(T_2)$ is shown below.

$$v_{16}(T_2) = F_r - \frac{F}{b} T_2 = 0 \tag{39}$$

In the stop mode, the variable pulse generator 16 stops. Next, the operating duration of the fixed pulse generator 18 will be explained.

In the case of formula (30), said duration $T_{df}$ is shown from the formula (18) and (32) as follows.

$$T_{df} = (v_{17}(t) \times T_r)/v_{18}(t) = ((S/a) \times a)/(S/b) = b \tag{40}$$

In the case of formula (31), the operating duration $T_{d2}$ of the fixed pulse generator 18 is shown as follows from the formulae (18) and (34).

$$T_{d2} = v_{17}(t) \times T_1/v_{18}(t) \tag{41}$$
$$= \frac{S}{a} \times a\sqrt{\frac{2L}{(a+b)F}} \bigg/ \frac{S}{b} = b\sqrt{\frac{2L}{(a+b)F}}$$

It should be appreciated from the formulae (36), (38), (40) and (41), that the variable pulse generator 16 stops at the same time as the fixed pulse generator 18 stops.

Figure 8:
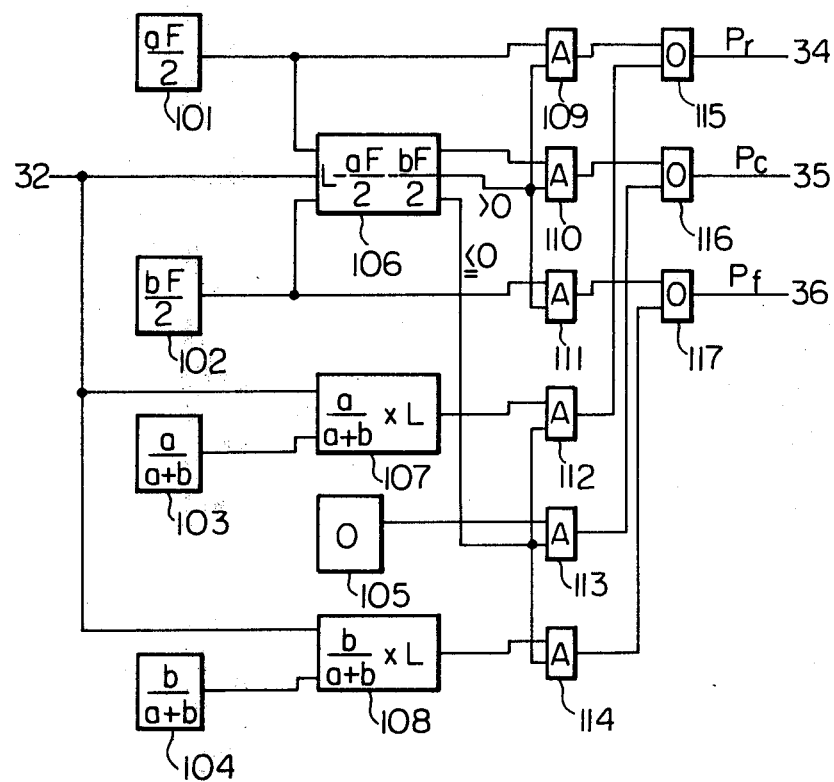
FIG. 8 is the detailed block-diagram of the calculator 36 shown in FIG. 7.

FIG. 8 shows the block-diagram of the calculator 33 in FIG. 7. In FIG. 8, the reference numerals 101, 102, 103, 104 and 105 are registers for storing a constant, 106 is a subtractor, 107 and 108 are multipliers, 109, 110, 111, 112, 113 and 114 are AND circuits, 115, 116 and 117 are OR circuits. The value L in the register 32 is applied to the subtractor 106, and the multipliers 107 and 108. The register 101 applies the constant aF/2 to the subtractor 106 and the AND circuit 109, the register 102 applies the constant bF/2 to the subtractor 106, and the AND circuit 111. The register 103 applies the constant a/(a+b) to the multiplier 101, the register 104 applies the constant b/(a+b) to the multiplier 108, the register 105 applies zero to the gate circuit 113. The subtractor 106 provides the value (L−aF/2−bF/2) to the AND circuit 110, the multiplier 107 provides the product ((a/(a+b))×L) to the AND circuit 112, the multiplier 108 also provides the product ((b/(a+b))×L) to the AND circuit 114.

When the output of the subtractor 106 (=L−aF−bF) is positive, the subtractor 106 applies the gate signal to the AND circuits 109, 110 and 111, which then pass the signals aF/2, L−aF/2−bF/2, and bF/2, respectively, to the registers 34, 35 and 36, respectively, through the OR circuits 115, 116 and 117. When the output of the subtractor 106 (=L−aF−bF) is zero or negative, the subtractor 106 applies the gate signal to the AND circuits 112, 113 and 114, which then pass the signals (a/(a+b))×L, O, and (b/(a+b))×L to the registers 34, 35 and 36 respectively, through the OR circuits 115, 116 and 117.

As explained above, in the embodiment in FIGS. 7 and 8, the output pulses from the fixed pulse generator 17 are cancelled by those from the other fixed pulse generator 18, and the length of table travel depends only upon the number of pulses provided by the variable pulse generator 16. Accordingly, the length of travel can be precisely controlled, and the position that the table stops can be accurately controlled, even when the fixed pulse generators 17 and 18 do not operate strictly according to the formula (18).

As explained above in detail, the present invention, which has a calculator for calculating a command position, is capable of controlling the velocity of the table during the acceleration mode and the deceleration mode, and of maintaining constant acceleration. Thus, the acceleration time and/or the deceleration time can be reduced. And further, as a DC motor is utilized for driving the table, heat consumption by the motor can be reduced by maintaining constant acceleration and/or deceleration torque.

From the foregoing it will now be apparent that a new and improved acceleration and deceleration system has been found. It should be understood of course that the embodiments disclosed are merely illustrative and are not intended to limit the scope of the invention.

Reference should be made to the appended claims, therefore, rather than the specification as indicating the scope of the invention.

What is claimed is:

1. A digitally controlled acceleration and deceleration system comprising a motor for moving a table, a motor drive for driving said motor, a first detector means for detecting the present position of said table, a second detector means for detecting the velocity of said table, circuit means for providing a product of said detected velocity and a predetermined constant $\tau$, position register means for receiving an input command pulse from a command position apparatus and accumulating the same to provide the goal position for said table, first comparator means for providing a difference between the output of said position register means and said first detector means, and a second comparator for providing a difference between the output of said first comparator means and the output of said circuit means, characterized in that said command position apparatus comprises;

(a) variable pulse generator means for providing a pulse train whose frequency during an acceleration mode increases from zero to a predetermined frequency F at a constant rate F/a; during a constant speed mode said frequency F is maintained; in a deceleration mode said frequency decreases from F to zero at a constant rate F/b; and in an acceleration mode said frequency increases at a constant rate F/a until the beginning of the deceleration mode, and in the deceleration mode said frequency decreases to zero at a constant rate F/b, (b) first fixed pulse generator means for providing a pulse train at a frequency $\tau \cdot F/a$ in the acceleration mode, (c) second fixed pulse generator means for providing a pulse train at a frequency $\tau \cdot F/b$ in the deceleration mode, (d) means for providing a moving direction to the pulse train of said variable pulse generator means, (e) means for providing a moving direction to the pulse train of said first fixed generator means, (f) means for providing a moving direction to the pulse train of said second fixed pulse generator means, and (g) means for combining said pulse trains for providing input command pulses to said position register.

2. A digitally controlled acceleration and deceleration system according to claim 1, wherein said command position apparatus further comprises:

(a) circuit means for calculating aF/2, L−aF/2−bF/2, and bF/2 for the acceleration moving length, the constant speed moving length and the deceleration moving length, respectively, when the command moving length L satisfied L>aF/2+bF/2, and calculating (a/(a+b))L,O, and (b/a+b))L for the acceleration moving length, the constant speed moving length and the deceleration moving length, respectively, when the command moving length L satisfies L≦aF/2+bF/2, (b) circuit means for storing the acceleration moving length and providing the content of the same to a subtracting counter means at the beginning of the acceleration, (c) circuit means for storing the constant speed moving length and providing the content of the same to said subtracting counter means at the beginning of the constant speed mode, (d) circuit means for storing the deceleration moving length and providing the content of the same to said subtracting counter means at the beginning of the deceleration, (e) subtracting counter means for subtracting the pulse train of said variable pulse generator means from an input numerical value, (f) circuit means for providing a zero detecting signal when the content of said subtracting counter means is zero, (g) control circuit means for changing said operational mode, upon receipt of said zero detecting signal, from the acceleration mode to the constant speed mode, from the constant speed mode to the deceleration mode, or from the deceleration mode to stop, (h) up/down counter means for incrementing the content of the same by the pulse train of the first fixed pulse generator means and decrementing the content of the same by the pulse train of the second fixed pulse generator means, and (i) circuit means for stopping said second fixed pulse generator means when the content of said up/down counter means is zero.

* * * * *